July 11, 1939. W. F. KIESEL, JR Re. 21,147
REFRIGERATOR CAR AND THE LIKE
Original Filed April 2. 1935 4 Sheets-Sheet 1
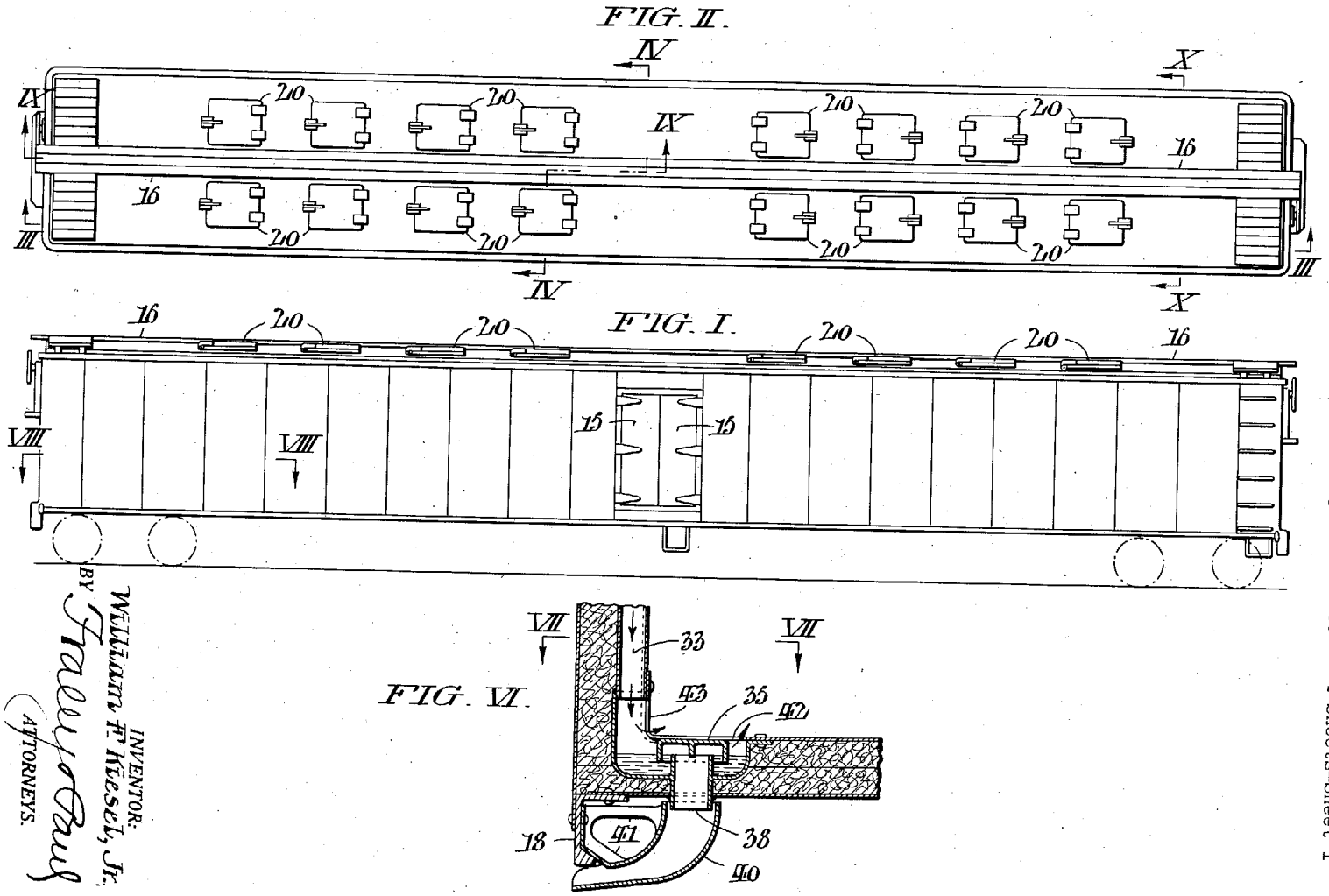
INVENTOR:
William F. Kiesel, Jr.
BY Fraley & Paul
ATTORNEYS.

REFRIGERATOR CAR AND THE LIKE
Original Filed April 2, 1935 4 Sheets-Sheet 2
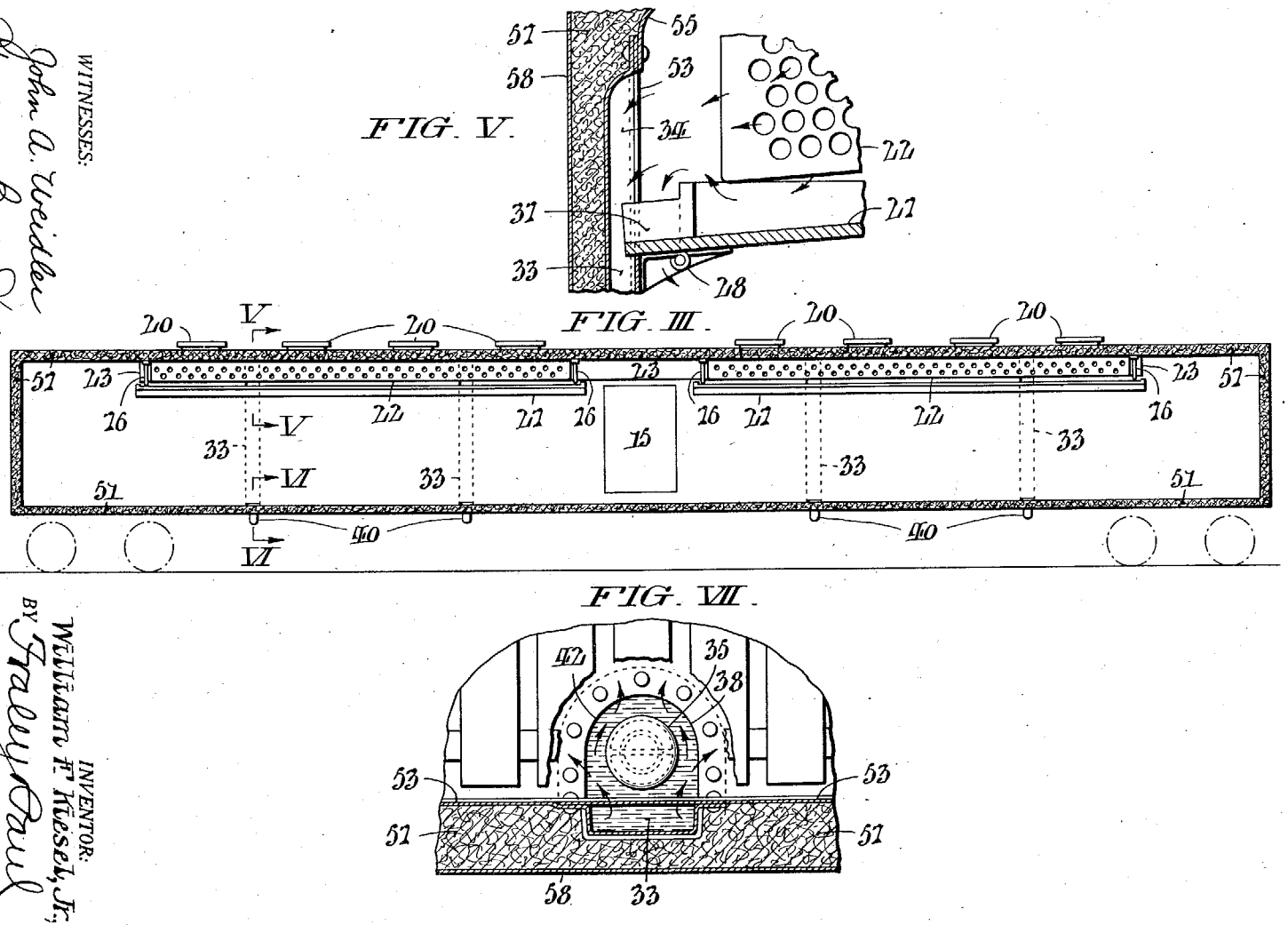
WITNESSES:
John A. Weidler
William Bell, Jr.
INVENTOR:
William F. Kiesel, Jr.,
BY Fraley & Paul
ATTORNEYS.

July 11, 1939. W. F. KIESEL, JR Re. 21,147
REFRIGERATOR CAR AND THE LIKE
Original Filed April 2, 1935 4 Sheets-Sheet 3
FIG. IV.
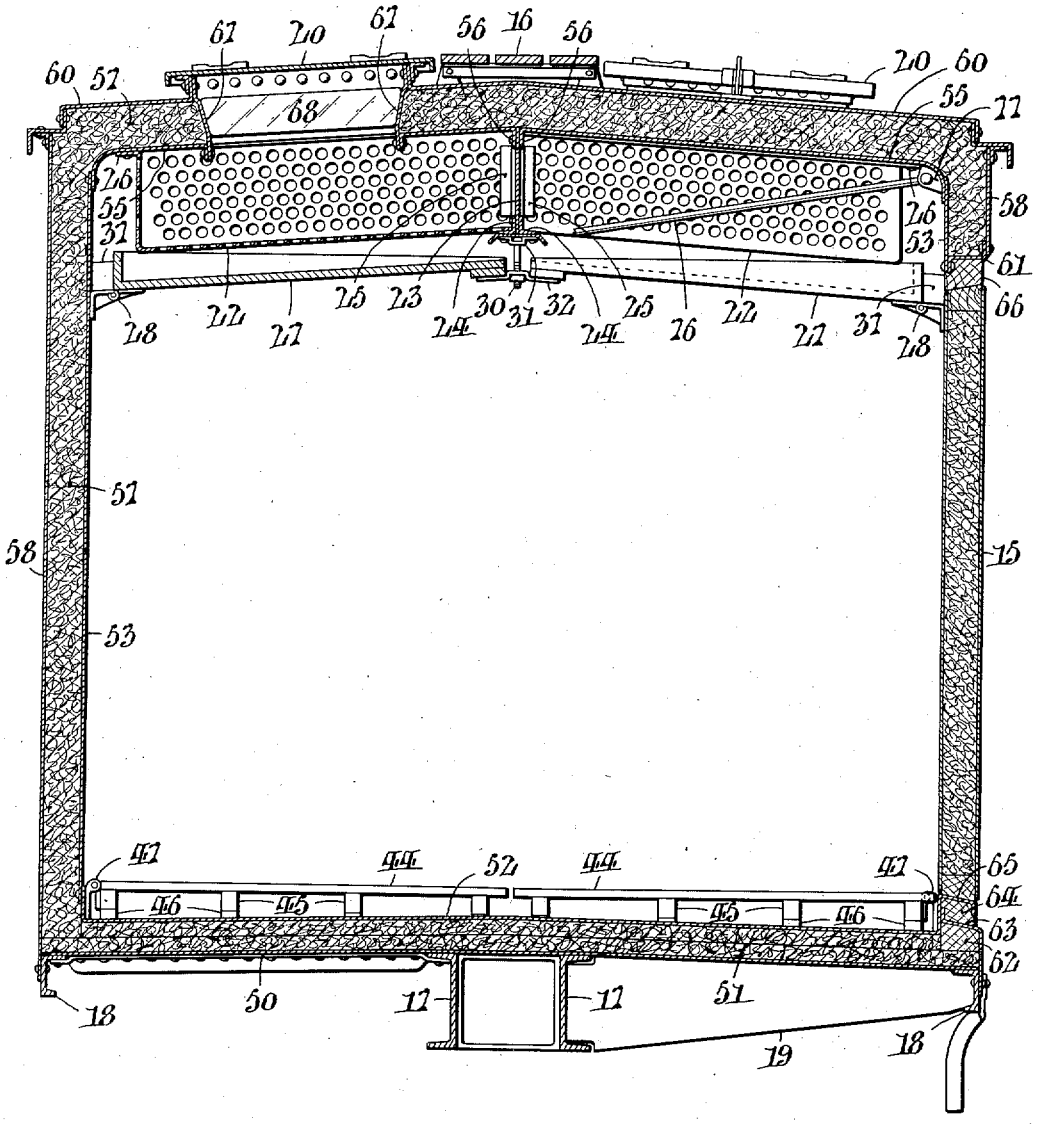
WITNESSES:
John A. Weidler
William Bell, Jr.
INVENTOR:
William F. Kiesel, Jr.,
BY Fraley & Paul
ATTORNEYS.

REFRIGERATOR CAR AND THE LIKE
Original Filed April 2, 1935 4 Sheets-Sheet 4
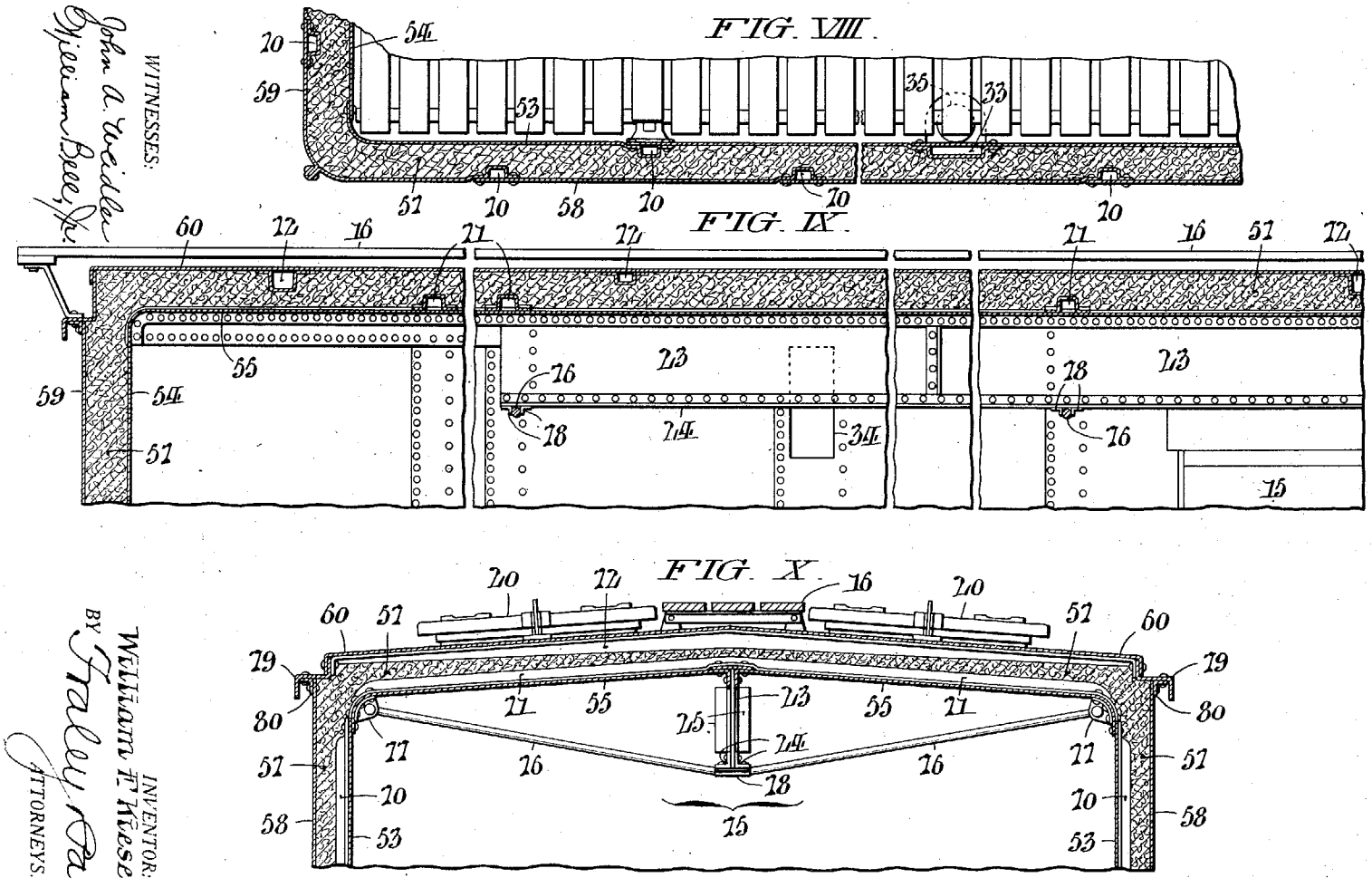
WITNESSES:
John A. Weidler
William Bell, Jr.
INVENTOR:
William F. Kiesel, Jr.,
BY Fraley & Paul
ATTORNEYS.

Reissued July 11, 1939

Re. 21,147

UNITED STATES PATENT OFFICE 21,147

REFRIGERATOR CAR AND THE LIKE

William F. Kiesel, Jr., Hollidaysburg, Pa., assignor to The Pennsylvania Railroad Company, Philadelphia, Pa., a corporation of Pennsylvania Original No. 2,093,896, dated September 21, 1937, Serial No. 14,234, April 2, 1935. Application for reissue September 13, 1938, Serial No. 229,770

31 Claims. (Cl. 62—17)

This invention relates to refrigerator cars or car bodies whether permanently attached to the running gear or not, and the like, and especially to cars of a "top-iced" type, although some features are applicable to other types of refrigerator car bodies. In suitable forms of embodiment, such as that hereinafter described, the invention minimizes heat leakage; affords maximum lading space, free of obstructions; and combines lightness of construction with strength and thorough heat insulation. Still other features and advantages of the invention will appear from the following description of a species or embodiment thereof, and from the drawings. So far as novel over the art, indeed, all the features shown or described are of my invention.

In the drawings, Fig. 1 is a side elevation of a refrigerator car body conveniently embodying the invention.

Fig. 2 is a corresponding plan view.

Fig. 3 shows a longitudinal vertical section through the car body, taken as indicated by the line and arrows 3—3 in Fig. 2.

Fig. 4 shows a cross-section, taken as indicated by the line and arrows 4—4 in Fig. 2.

Fig. 5 is a fragmentary cross-section near the roof of the car, taken as indicated by the line and arrows 5—5 in Fig. 3.

Fig. 6 is a fragmentary cross-section near the floor of the car, taken as indicated by the line and arrows 6—6 in Fig. 3.

Fig. 7 is a fragmentary horizontal section and plan, taken as indicated by the line and arrows 7—7 in Fig. 6.

Fig. 8 is a fragmentary horizontal sectional view, with a portion of the car broken out and omitted, taken as indicated by the line and arrows 8—8 in Fig. 1.

Fig. 9 is a fragmentary vertical sectional view, with portions of the car broken out and omitted, taken as indicated by the line and arrows 9—9 in Fig. 2.

Fig. 10 shows a cross-section through the upper or top portion of the car, taken as indicated by the line and arrows 10—10 in Fig. 2.

As shown in Figs. 1, 2, 3 and 4, the car body resembles those of refrigerator cars hitherto used in general appearance, having doors 15, 15 in its opposite sides at mid-length, and the usual walk 16 along the center of its roof, besides the usual underframe of longitudinal center and side-sills 17 and 18, 18, and transverse bolsters 13.

To allow of "icing" the car from the top very conveniently and quickly, the car roof has "ice-hatches" 20 at opposite sides of its longitudinal mid-portion, and of the walk 16 thereon. These hatches 20 open into top refrigerant or ice-bunkers 22, 22 directly beneath. As here shown, there are entirely separate bunker structures 22, 22 for the opposite ends of the car, separated a somewhat greater distance from one another than the widths of the center doors 15, 15. In the present instance, each bunker 22 has a plurality of the hatches 20, making it easy to put refrigerant or ice into every part of each bunker.

Between the bunkers 22, 22 in the ends of the car is a deep longitudinal girder 23 (Figs. 3, 4, and 10) directly under the mid-portion of the roof, and forming part of the top structure of the car. As here shown, this girder 23 is a plate girder, comprising a metal plate with flange angles 24, 24 along its lower edge and upright stiffening angles 25 at intervals throughout its length, on opposite sides of the plate alternately. The bunkers 22 are shown as of sheet metal (preferably non-corrodible), perforated or foraminated with a multitude of closely spaced round holes, for the sake of lightness, free circulation of air in contact with the refrigerant or ice, and free drainage of water due to the melting of ice. In the present instance, the bunkers 22, 22 of each pair are supported by the girder 23 at their adjacent sides, resting on its lower flanges formed by the angles 24, 24, and having the girder web plate as a common side wall or dividing septum. Their outer sides need not be formed by the side walls of the car body, but may preferably consist of upward-bent portions of the foraminated sheet metal of the bunker. At their outer sides, the bunkers 22, 22 may be supported from the top structure of the car in any suitable way, as by outbent flanges 26 secured to the roof; and so, likewise, at their foraminated transverse walls or ends.

Close under the bunkers 22, 22 are shown drainage pans 27, 27 (Figs. 3 and 4), for the meltage water from the bunkers and to catch condensate. These pans 27, 27 which provide an air cooling compartment under the ice bunkers or refrigerant containers may be constructed as trays of light insulating wood such as balsa, preferably covered with sheet copper or other waterproof material. They may be supported from the side walls of the car at their outer sides or edges, and from the girder 23 at their inner, adjacent sides or edges. As shown in Fig. 4, each pan 27 is hinged by bracket hinges 28 to the car side at its outer edge, with an interval permitting air circulation, and has its inner edge suspended from the girder 23 by anchors 30. Each anchor 30 comprises a bolt attached to the girder angle-flanges 26, 26 by a clip 31, and a clip bar 32 resting on the nut of the anchor bolt and engaging under the adjacent inner edges of the pans 27, 27. The mid-portion of each clip bar 32 is offset upward, thus affording shoulders that engage the edges of the pans 27, 27 and keep the clip bar from accidentally turning out from under the pans 27, 27, so as to let them drop. By slightly lifting the inner sides of the pans 27, 27, the clip bars 32 are released so that they can be turned to allow the pans to be swung down against the car sides, to facilitate cleaning the pans and the ice bunkers 22. Between the angles 24—24 and the clip 31 is a hood which is wider than the clip 31 and has its side margins bent downwardly to form a watershed to prevent melted ice or other liquid refrigerant from entering the lading compartment through the space between the inner edges of the pans 27—27.

As shown in Fig. 4, the car roof, the bottoms of the bunkers 22, 22, and the drainage pans 27, 27 all slope from the girder 23 toward the car sides. Meltage water from the pans 27, 27 may drain away through vertical ducts 33 in the side walls of the car, shown (Figs. 3 and 5) as open at their upper ends, at 34, into the pans and the space above the pans, and at their lower ends into traps 35 in the car floor (Figs. 6 and 7). The outer side wall of each pan 27 may have outlet openings corresponding to the upper duct openings 34, with spouts 37 projecting over the lower edges of the openings 34 into the ducts 33. As shown in Fig. 6, each trap 35 has a bottom outlet 38 that delivers to a spout 40 under the car floor, this spout 40 being attached (by a bracket 41) to the longitudinal side sill 18 of the car body. Each trap 35 may also be open at 42 up through the car floor, to permit meltage of ice placed in the lading space of the car to drain off through the trap. As shown in Fig. 4, the car floor slopes from the center toward each side, to facilitate drainage to the traps 35. The lower end of each duct 33 may be open into the bottom of the lading space through the trap opening 42, and also at 43 just above the car floor and the trap 35. Thus cold air from the ice bunkers 22, 22 may enter the upper ends of the ducts 33 at 34 and pass down through the ducts and out into the lading space at the floor.

As shown in Figs. 4, 7 and 8, the car is provided with foraminous floor racks 44, consisting of transverse, spaced apart wood slats fastened to longitudinal wooden sills 45 that rest on attached blocks or shims 46. These blocks 46 not only allow water to drain freely toward the sides of the car, unobstructed by the sills 45, but also allow cold air from the ducts 33 to circulate freely under the lading, and to pass up through the racks 44 wherever the lading allows; the space between the floor racks or foraminous lading supporting means and the floor constituting a distributing space which extends under substantially the whole of the lading compartment so that cold air will be distributed with substantial uniformity through the lading. As shown in Fig. 4, the racks 44 are divided into sections along the middle of the car, and these sections are hinged to the car sides by bracket hinges 47, so that the racks may be swung up against the walls to facilitate cleaning.

It may generally be preferred to have downward circulation of cold air from the refrigerant bunkers 22 mainly or entirely through the ducts 33,—and thence through the traps 35 and under the floor racks 44, thus providing cooling of the car body walls by both air and melted ice, humidification of the air before it is delivered to the lading, and refrigeration of the lading from the bottom up,—with return circulation of warmer air up from the lading space between the inner edges of the pans 27, 27 and so back into the bunkers. If the downward circulation through the ducts 33 should be impeded in any way, however, as by clogging of the ducts 33 or the traps 35 with dirt, or by a lading that covers the floor racks 44 completely, then the cold air can overflow from the pans 27, 27 and descend (through the space between the outer edges of the pans and the side walls of the lading space), giving refrigeration from the top down.

The construction of the car body is most clearly illustrated in Figs. 1, 3, 4, 8, 9 and 10. Broadly speaking, it may be characterized as comprising complete inner and outer preferably metallic shells thermo-insulated from one another by interposed heat-insulating material,—which also serves as a stress-transmitting medium between the shells, so that they reinforce one another structurally. Except at the side doorways at 15, 15 and the roof hatch openings at 20, direct metallic or other heat-transmitting connection between the inner and outer shells is avoided. Stiffening reinforcement for one or both shells may be provided in the interspace between them,—that of each shell thermo-insulated from the other shell and its reinforcement. Likewise, structural support for the upper portion of the car body and for the ice-bunkers 22, 22, etc., may be provided in the interspace, as well as (in part) by the side walls.

As best shown in Fig. 4, the floor of the car comprises an outer sheet metal floor 50 laid directly on the underframing (which includes sills 17 and 18, 18 and bolsters 19), a thermoinsulative floor 51 laid on this outer metal floor, and an inner sheet metal floor 52 laid on top of said thermoinsulative floor 51. The outer floor 50 may be preferably of $\frac{1}{16}$ in. mild steel; the thermoinsulative flooring 51 may consist of two layers of balsa wood, each 2 in. thick; and the inner floor 52 may be of ⅛ in. mild steel. This composite floor having been laid, the inner sheet metal side and end walls 53, 53, and 54 may be erected, and the inner sheet metal roof shell 55 may be installed, including the longitudinal plate girder 23. As here shown, the edges of the inner floor shell 2 are bent upward and the wall shell 53, 54 is secured to them (as by riveting); and the margins of the inner roof shell 55 are bent downward on a curve, and the wall shell 53, 54 is similarly secured to it. The upper margin of the girder plate 23 lies between downturned margins 56, 56 of the two widths of the inner roof plating 55, which are secured to said plate 23, as by riveting. For the inner shell walls 53, 54 and roof 55, mild sheet steel $\frac{1}{16}$ in. thick may be used. The inner shell having been thus erected on the floor, it is covered with suitable heat-insulating material 57 such, for instance, as "alfoil", which is a sheet material of thin aluminum in a crinkled condition. For example, sixteen layers of such material may be used for the side walls, and nineteen layers for the roof. Then the outer shell side and end walls 58, 58 and 59 and roof 60 (which may all be of $\frac{1}{16}$ in. mild steel) are put in place and secured to one another and to the sills 18, 18 as by riveting. At the openings of the side doors 15, 15, Z-bars 61 connect the outer shell walls 58, 58 to the inner shell walls 53, 53. At the door sills, heat insulating (wood) pieces 62 are enclosed in the inturned outer shell portions 63, and over these are placed similar pieces 64, which are enclosed in sheathings provided by bending outerward suitable extensions 65 of the inner sheet metal floor 52. At the head of each door 15, a thermoinsulative (wood) facing piece 66 is provided. The doors, 15, 15 themselves may be of any suitable thermoinsulative construction. The hatch openings 20 are lined with sheet metal 67 secured (as by riveting) to downturned and upturned flanges of the inner and outer roof shells 55, 60. Besides their hinged covers shown in Figs. 1, 2, 3, 4, etc., the hatches 20 have inner closures 68 of any suitable thermoinsulative material.

As shown in Figs. 8, 9, and 10, the inner and outer shell plating 53, 54 and 58, 59 of the walls is reinforced and stiffened with upright braces 70 embedded in the heat-insulating material 57 between the inner and outer shells. In the roof, the inner and outer shell plating 55 and 60 is similarly reinforced and stiffened with transverse braces 71, 72 of channel section. While the roof braces 71, 72 are shown as separate (channel) members with flanges secured to the sheets 55 and 60 (as by welding), the wall braces 70 are shown as integral with the sheet metal of the walls: viz., in Fig. 8 the wall shells may be seen to consist of a series of plates with vertical margins overlapping and secured together (as by riveting), and the braces 70 are formed by displacing inward the inner plate margins at the overlaps. For greater strength, the inner plate margins are doubled inward, preferably into hollow (channel) form, and are secured to the overlapping outer plates at both sides of each double brace 70 thus formed. Preferably, the upright ducts 33 for downflow of water and air from the bunker space above the pans 27, 27 are similar in construction to the braces 70,—though of greater width lengthwise of the car,—and also serve as braces; or, in other words, the ducts 33 are really extra wide braces 70.

The longitudinal girder 23 may be supported by transverse girders 75 (Figs. 3, 9 and 10) adjacent the ends of the bunkers 22, but outside them. These transverse girders 75 are preferably of more or less open truss construction, so as not to interfere with the circulation of air through the foraminous end walls of the bunkers 22. Figs. 9 and 10 show a girder 75 as consisting of a lower roof-brace channel 71 as compression member and a tie rod 76 as tension member, with an end portion of the plate that forms the web of girder 23 serving as a center "strut" between them. In other words, the end portions of the web plate are common to the longitudinal and transverse girders in the form of construction here illustrated. The ends of tie rod 76 are anchored to bracket ears 77 secured (as by rivets) to the ends of brace 71 and to the upper ends of corresponding wall braces 70, while the tie rod 76 extends across the lower portion of girder 23, and is secured by a clip 78 to the lower flange angles of the girder. Thus these wall braces 70 between which the roof brace 71 is spanned serve as structural uprights to support the transverse and longitudinal girders 75 and 23, the ice bunkers 22, 22, and, to a large extent, the middle of the roof and the drain pans 27, 27. As shown in Fig. 10, the channel braces 71 for the inner roof shell plating 55 are of uniform depth except at their ends, which are flattened and bent down part way around the corresponding bends of the roof margins. The upper ends of the corresponding upright braces 70 are similarly flattened and bent inward. The channel braces 72 for the outer roof shell plating 60 taper in depth from the center of the roof to the eaves, where their ends are flattened and bent down, and secured (as by rivets) to a Z-bar eaves plate 79 and to the downturned edges of the outer roof plating 60. The Z-bar 79 overlies the upper edges of the outer wall-shell plating 58 and is secured to an angle bar 80 itself secured to said plating 58.

While I have herein referred to ice as the refrigerant employed, and spoken of the car as "top-iced", yet it will be apparent to those skilled in the art that the utility of my invention is not limited to ice as distinguished from other refrigerant means or substances, which might be introduced at the top of the car.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. In a refrigerator car body construction comprising an inside metal shell and an outside metal shell, interposed heat insulating material thermo-insulating them from one another, channel braces for stiffening said inner and outer shells embedded in said interposed insulating material at intervals along the length of the car, and offset from one another, and top refrigerant-bunkers in the car, above its lading space, supported from certain of said braces.

2. A refrigerator car body wall construction comprising inside and outside metal shells composed of longitudinal series of metal plates with overlapping margins secured together, the plate margins toward the interspace of the shells at the overlaps being displaced inward to form stiffening braces, interposed heat insulating material in the interspace thermo-insulating said shells and their said stiffening braces from one another, and top refrigerant-bunkers in the car, above its lading space, supported from certain of said braces.

3. A refrigerator car body wall construction comprising inside and outside metal shells composed of longitudinal series of metal plates with overlapping margins, the plate margins toward the interspace of the shells at the overlaps being doubled inward into double stiffening braces, and secured to the overlapping plate margins at both sides of each such double brace, interposed heat-insulating material in the interspace thermo-insulating said shells and their said stiffening braces from one another, a top structure supported directly by certain of said stiffening braces, and top refrigerant-bunkers in the car, above its lading space, supported directly from said top structure.

4. A refrigerator car body construction comprising an inside metal shell and an outside metal shell, interposed heat insulating material thermo-insulating them from one another, uprights for stiffening said inner and outer shells embedded in said interposed insulating material at intervals along the length of the car, and offset from one another, a top structure supported directly from certain of said uprights, and top refrigerant-bunkers in the car, above its lading space, supported directly from said top structure.

5. In a top-iced refrigerator car body, the combination of a side wall including inside and outside sheet metal shells, and a top structure; a top refrigerant-bunker supported by the top structure, and a subjacent drain pan, both above the lading space of the car; and a hollow structural upright in the interspace between said shells serving to support the top structure of the car and as a drainage duct for said drain pan.

6. In a top-iced refrigerator car body, the combination of a side wall including inside and outside sheet metal shells, a top refrigerant-bunker supported by the top structure of the car and a subjacent drain pan, both above the lading space of the car, and a hollow structural upright in the interspace between said shells serving to support the top structure of the car and open, for air circulation, to the space above said pan and to the lading space at the car floor.

7. In a top-iced refrigerator car body, the combination of a side wall including inside and outside sheet metal shells, a top refrigerant-bunker and a subjacent drain pan above the lading space of the car, and a duct in said side wall, between said inside and outside shells, open for air circulation therethrough directly to the space above said pan and to the lading space at the car floor, and also draining off water from said pan and delivering it below the car floor.

8. In a top-iced refrigerator car body, the combination with side walls and a roof having refrigerant-hatches therein at both sides of its mid-portion, of top refrigerant-bunkers under said hatches supported by the top structure of the car, and drain pans under said bunkers and hatches having their outer edges hinged to the car sides and suspended from the car roof at their adjacent inner edges.

9. In a top-iced refrigerator car body, the combination with side walls and a roof having hatches therein at both sides of its mid-portion, of a longitudinal girder under said mid-portion of the roof, top refrigerant bunkers at either side of said longitudinal girder, supported by the latter at their adjacent inner sides and from the top structure of the car at their outer sides, and drain pans under said bunkers having their outer edges hinged to the car sides, and supported from said longitudinal girder at their adjacent inner edges.

10. In a top-iced refrigerator car body, the combination with side walls and a roof having hatches therein at both sides of its mid-portion, of a girder structure comprising a longitudinal member extending under said mid-portion of the roof and transverse members supported at the side walls and intermediately supporting the ends of said longitudinal member, and top refrigerant bunkers between said transverse members at either side of said longitudinal member, supported by the latter at their adjacent inner sides and from the top structure of the car at their outer sides, and drain pans under said bunkers having their outer edges hinged to the car sides, and supported from said longitudinal member at their adjacent inner edges.

11. In a top-iced refrigerator car body, the combination with the car walls and roof, of a girder structure comprising a longitudinal member extending under and supporting the mid-portion of the roof for the major portion of the length of the lading space of the car, and supported from the car walls; and top refrigerant bunkers at either side of said longitudinal member, likewise extending the major portion of the length of the lading space of the car, and supported by its top structure; said roof having hatches therein, at both sides of its said mid-portion, arranged to permit the distribution of refrigerant substantially equally throughout the length of said top refrigerant bunkers.

12. In a top-iced refrigerator car body, the combination with side walls and a roof, of a girder structure comprising longitudinal and transverse members, the former extending under and supporting the mid-portion of the roof for the major portion of the length of the lading space of the car, and the latter supported at the side walls and intermediately supporting the former; and top refrigerant bunkers between the transverse members, at either side of the longitudinal, likewise extending the major portion of the length of the lading space of the car, and supported by its top structure; said roof having hatches therein, at both sides of its said mid-portion, arranged to permit the distribution of refrigerant substantially equally throughout the length of said top refrigerant bunkers.

13. In a top-ice refrigerator car body, the combination with side walls comprising inside and outside sheet metal shells with structural uprights in their interspace, and a roof with hatches therein at both sides of its mid-portion; of a girder structure comprising a longitudinal member extending under said mid-portion of the roof, transverse members supported at their ends by said uprights in the side walls and intermediately supporting the ends of said longitudinal member, and top refrigerant-bunkers between said transverse members at either side of said longitudinal member, supported by the latter and by said uprights in the side walls.

14. In a top-iced refrigerator car body, the combination with side walls comprising inside and outside sheet metal shells with structural uprights in their interspace; of a roof likewise comprising inside and outside sheet metal shells with transverse braces in their interspace spanned between said structural uprights in the side walls, and having hatches therein at both sides of its mid-portion; a longitudinal girder under said mid-portion of the roof; longitudinal top refrigerant-bunkers with openwork ends at either side of said longitudinal girder, supported thereby and by said uprights in the side walls; and tie rods connected between the ends of said roof braces and extending across the lower portion of said longitudinal girder, and thus coacting with the roof braces to form transverse trusses supporting said longitudinal girder from said uprights in the side walls.

15. A refrigerator comprising a refrigerant compartment adjacent the top of the refrigerator, an air cooling compartment therebelow having an air intake higher than the air outlet, a lading compartment below the cooling compartment, a foraminous floor rack providing a cold air distributing space below the lading compartment, and a flue associated with a vertical wall of the refrigerator extending without discharge openings between the outlet of the cooling compartment and the space below the floor rack whereby all of the air entering the flue from the cooling compartment flows through the flue to the space below the lading and is distributed by the floor rack into the lading compartment, thus providing refrigeration from the bottom up.

16. A refrigerator car body comprising a refrigerant compartment adjacent the top of the refrigerator, an air cooling compartment therebelow having an air intake higher than the air outlet, a lading compartment below the cooling compartment, a foraminous floor rack providing a space below the lading compartment, a hollow upright frame member of the car body forming a flue extending between the outlet of the cooling compartment and the space below the floor rack whereby air in the cooling compartment being cooled by the refrigerant flows through the flue to the space below the lading and is distributed by the floor rack into the lading compartment, thus providing refrigeration from the bottom up.

17. A structure as defined in claim 15 wherein means are provided so that if the circulation of air through said flue should be impeded refrigerated air may flow directly from the air cooling compartment into the lading compartment, thus providing refrigeration of the lading from the top down.

18. In a refrigerator car body, the combination of a vertical wall comprising inside and outside sheathings, a refrigerant bunker adjacent the roof of the car body, and a subjacent drip pan both above the lading space of the car body, and a hollow post between said sheathings and partially supporting the bunker, said hollow post forming a flue for air circulation between the space above the pan and the lading space at the car floor.

19. In a refrigerator car body, the combination of a vertical wall comprising inside and outside sheathings, a refrigerant bunker adjacent the roof of the car body, and a subjacent drip pan both above the lading space of the car body, and a duct between said sheathings and open for air circulation between the space above the pan and the lading space at the car body floor, said duct being arranged to receive water draining off from said pan and to discharge it adjacent the floor of the car.

20. A structure as defined in claim 15 wherein a drip pan is arranged between the refrigerant compartment and the lading compartment, and the edge of the drip pan has an upstanding flange provided with a spout leading into said flue, and an opening is provided between said flange and the wall of the car body forming air communication between the cooling compartment and the lading compartment so that if air circulation through said flue is impeded cooled air may flow directly from the cooling compartment to the lading compartment, thus providing refrigeration of the lading from the top down.

21. A refrigerator car body having a floor which slopes downwardly from substantially the longitudinal center of the car body toward the sides of the car body, means adjacent the sides of the car body to trap water drained from the sloping floor to humidify the circulating air, a refrigerant container in the upper part of the car body, and means for causing circulation of cold air from the refrigerant container to the lower portion of the car body, over said trapped water and back to the refrigerant container whereby said air is humidified.

22. A structure as defined in claim 15 having a floor which slopes downwardly from substantially the longitudinal center of the refrigerator toward the sides of the refrigerator, and a foraminous lading supporting structure having a horizontal upper surface which is supported by longitudinally extending sills resting upon spaced apart shims to allow water to drain toward the sides of the refrigerator and to allow cold air from the flue to circulate under the lading.

23. A structure as defined in claim 15 having a floor which slopes downwardly from substantially the longitudinal center of the refrigerator toward the sides of the refrigerator, and means adjacent the sides of the refrigerator to trap water drained from the sloping floor to humidify the circulating air, and a foraminous lading supporting structure having a horizontal upper surface which is supported by longitudinally extending sills resting upon spaced apart shims to allow water to drain toward the sides of the refrigerator and to allow cold air from the flue to circulate under the lading.

24. A refrigerator car body having spaced apart, side walls and a lading compartment therebetween in combination with a flue having openings only at the top and bottom associated with each of said walls, a refrigerant compartment in the upper part of the lading compartment which extends substantially between said walls, an insulated drip pan structure spaced below the refrigerant compartment and forming an air cooling chamber with an outlet communicating with the upper part of each of said wall flues, said drip pan structure comprising portions spaced apart substantially midway between said walls, said portions sloping downwardly toward the respective wall flues so that the space between said portions constitutes an air intake higher than said outlets, and a foraminous floor rack providing a cold air distributing space below the lading compartment communicating with the lower part of each of said wall flues whereby all of the air entering said flues from the cooling chamber flows downwardly through the said wall flues to the space below the lading and is distributed by the floor rack into the lading compartment.

25. A refrigerator car body having spaced apart walls and a lading compartment therebetween in combination with a flue having openings only at the top and bottom associated with each of said walls, a refrigerant compartment in the upper part of the lading compartment which extends substantially between said walls, an insulated drip pan structure spaced below the refrigerant compartment and forming an air cooling chamber with an outlet communicating with the upper part of each of said wall flues, said drip pan structure provided with an opening substantially midway between said walls forming an air intake from the lading compartment to the cooling chamber, said intake being positioned higher than said outlets, and a foraminous floor rack providing a cold air distributing space below the lading compartment communicating with the lower part of each of said wall flues whereby all of the air entering said flues from the cooling chamber flows downwardly through the side wall flues to the space below the lading and is distributed by the floor rack into the lading compartment.

26. A structure as defined in claim 25 including means to prevent liquid refrigerant from the refrigerant container entering the lading space through said air intake opening.

27. In a refrigerator car body having a lading compartment and provided with ice containing means above said lading compartment; means associated with a wall of said car body providing a vertical duct extending to substantially the floor of the said car body, arranged so that air cooled by said ice passes into and downwardly through said flue and then upwardly through the lading compartment to the region of the ice containing means; means for collecting water formed by the melting of the ice and directing it into said flue; and means at the lower end of the flue for separating water from the air that has passed through the flue, whereby water as well as air is utilized for cooling said wall and the cold air before being drawn upwardly through the lading compartment is humidified.

28. In a refrigerator car body having a lading compartment and provided with ice containing means above the lading compartment; means associated with a wall of said car body providing a vertical duct extending to substantially the floor of said car body, arranged so that air cooled by said ice passes into and downwardly through said flue and then upwardly through the lading compartment to the region of the ice containing means; means for collecting water formed by the melting of the ice and directing it into said flue; and foraminous lading supporting means spaced from the floor of said car body and providing an air distributing space to receive cold air from said flue which extends under substantially the whole of the lading compartment so that cold air will be distributed with substantial uniformity through the lading.

29. In a refrigerator car body having a lading compartment and provided with ice containing means above the lading compartment; means associated with a wall of said car body providing a vertical flue extending to substantially the floor of said car body, arranged so that air cooled by said ice passes into and downwardly through said flue and then upwardly through the lading compartment to the region of the ice containing means; means for collecting water formed by the melting of said ice and directing it into said flue; and means at the lower end of the flue for separating water from the air that has passed through the flue, while retaining a certain amount of said water in the bottom of the car body, whereby water as well as air is utilized for cooling said wall and the air before being drawn upwardly through the lading space is humidified.

30. In a refrigerator car body having a lading compartment and provided with a refrigerant container above the lading compartment; means associated with a wall of said car body providing a vertical flue extending substantially to the floor of said car body and without discharge openings except at substantially the level of said floor, arranged so that air cooled by the refrigerant passes into and downwardly through said flue; a foraminous lading supporting means spaced from said floor providing an air distributing space to receive cold air from said flue which extends under substantially the whole of said lading compartment, whereby cold air will be distributed with substantial uniformity through the lading.

31. A refrigerator car body having a lading compartment; a refrigerant container above the lading compartment; a sloping floor for drainage of water; means for discharging water from the car body; means constituting a duct for refrigerated air leading from the region of said refrigerant container to the floor of the car; and a lading supporting floor rack having a substantially horizontal upper surface, which rack is of foraminous construction to permit water to flow over said floor to said water discharging means and to permit refrigerated air from said duct to pass through said rack into the lading space.

WILLIAM F. KIESEL, JR.